United States Patent [19]

Musch et al.

[11] Patent Number: 4,611,037

[45] Date of Patent: Sep. 9, 1986

[54] PROCESS FOR THE PRODUCTION OF POLYMERS HAVING REACTIVE END GROUPS

[75] Inventors: Rüdiger Musch, Bergisch Gladbach; Oskar Nuyken, Munich; Stephen D. Pask, Dormagen; Axel Vischer, Garching; Michael Walter, Munich, all of Fed. Rep. of Germany

[73] Assignee: Bayer Aktiengesellschaft, Leverkusen, Fed. Rep. of Germany

[21] Appl. No.: 762,948

[22] Filed: Aug. 6, 1985

[30] Foreign Application Priority Data

Aug. 18, 1984 [DE] Fed. Rep. of Germany ....... 3430518

[51] Int. Cl.$^4$ .............................................. C08F 4/00
[52] U.S. Cl. .................... 526/135; 526/206; 526/221; 526/237
[58] Field of Search ............... 526/135, 206, 221, 237, 526/348.7

[56] References Cited

U.S. PATENT DOCUMENTS

| | | | |
|---|---|---|---|
| 3,850,897 | 11/1974 | Priola | 526/135 |
| 4,016,346 | 4/1977 | Wojcik | 526/221 |
| 4,048,095 | 9/1977 | Wojcik | 526/221 |
| 4,276,394 | 6/1981 | Kennedy | 526/237 |
| 4,316,973 | 2/1982 | Kennedy | 526/348.7 |
| 4,342,849 | 8/1982 | Kennedy | 526/348.7 |

OTHER PUBLICATIONS

Kennedy et al., *Journal of Polymer Science*, 15: 2869-2982, (1977).

*Primary Examiner*—Paul R. Michl
*Attorney, Agent, or Firm*—Connolly & Hutz

[57] ABSTRACT

An improved process for the production of polymers having halogen end groups from cationically polymerizable monomers, the monomer being polymerized in an inert solvent at a temperature of from +10° to −130° C. using a catalyst system consisting of a metal halide and an organic halide, compounds corresponding to the following general formula being used as organic halides:

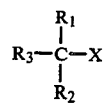

wherein
X represents a halogen atom;
$R_1$, $R_2$, $R_3$, represent $C_5$–$C_{10}$ cycloalkyl, or a $C_1$–$C_{20}$ straight- or branched-chain alkyl or

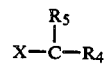

wherein
$R_4$ and $R_5$ represent $C_5$–$C_{10}$-cycloalkyl or a $C_1$–$C_{20}$ straight- or branched-chain alkyl;
and the organic halide has at least 5 carbon atoms and at most 50 carbon atoms and is in a concentration of from $10^{-1}$ to $10^{-6}$ mols per mol of monomer, while $BX_3$, $SnX_4$, $TiX_4$, $SbX_5$ or $FeX_3$, wherein X is fluorine, chlorine, bromine or iodine, is used as metal halide in from 2 to 500 times molar excess, based on the organic halide.

5 Claims, No Drawings

PROCESS FOR THE PRODUCTION OF POLYMERS HAVING REACTIVE END GROUPS

This invention relates to the production of macromolecular materials having terminal reactive groups by cationic polymerisation of cationically polymerisable monomers in the presence of particular metal halides and particular hydrocarbon halides.

A reaction system producing, by cationic polymerisation, products having two reactive end groups, so-called "telechelics", is described by J. P. Kennedy in J. Polym. Sci., Polymer Chem. Ed., 18, 1523, (1980). Such macromolecules having defined end groups should provide excellent prepolymers for the production of "tailored" copolymers having a controllable block length, for example.

However, a prerequisite for this is that such prepolymers should have as high a degree of purity as possible, that is each polymer chain of the reaction product should have the same number of reactive end groups (for example, 1,2 or 3) depending on the reaction conditions.

In the so-called "Inifer method" described by Kennedy, the polymerisation of isobutene is carried out in the presence of Friedel-Crafts-acids and aromatic hydrocarbon halides as initiators. As shown by J. P. Kennedy, S. Y. Huang and S. Feinberg in J. Polymer Sci., Chem. Ed., 15, 2801–2820, 2869–92, the saturated aliphatic halogenated hydrocarbons tested by them are unsuitable as initiators. However, if aromatic hydrocarbon halides are used, partial Friedel Crafts alkylation of the aromatic initiator by the monomer takes place as an undesirable side reaction at the beginning of polymerisation, which alkylation seriously limits the value of the method as macromolecules are produced by this side reaction which have an unreactive indane end group with the result that products having varying functionality are present in the polymer. This effect is particularly serious at relatively high polymerisation temperatures and with relatively high concentrations of initiators, based on the monomer.

Thus, it was surprising to observe that, when particular aliphatic halogenated hydrocarbons and particular metal halides are used, the cationic polymerisation of, for example, isobutene takes place contrary to the opinion of Kennedy, there being, of course, no indane formation.

Thus, the present invention relates to a process for the production of polymers having halogen end groups from cationically polymerisable monomers, the monomer being polymerised in an inert solvent at a temperature of from $+10°$ to $-130°$ C. using a catalyst system consisting of a metal halide and an organic halide, characterised in that the organic halide corresponds to the following general formula:

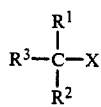

wherein

X represents a halogen atom;

$R_1$, $R_2$, $R_3$ represent $C_5$–$C_{10}$ cycloalkyl, or a $C_1$–$C_{20}$ straight- or branched-chain alkyl or

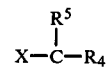

wherein $R_4$ and $R_5$ represent $C_5$–$C_{10}$ cycloalkyl or a $C_1$–$C_{20}$ straight- or branched-chain alkyl;

and that the organic halide contains at least 5 carbon atoms and at most 50 carbon atoms and is in a concentration of from $10^{-1}$ to $10^{-6}$ mols per mol of monomer, and that $BX_3$, $SnX_4$, $TiX_4$, $SbX_5$ or $FeX_3$, wherein X denotes fluorine, chlorine, bromine or iodine, is used as the metal halide in from 2 to 500 times molar excess, based on the organic halide.

Cationically-polymerisable monomers of the 1-butene, 2-methyl-butene, 4-methyl-1-pentene or vinyl cyclohexane type may be used as monomers, as described in: "Cationic polymerization of olefins" by J. P. Kennedy, J. Wiley and Sons, New York, in Tab. 1, section 1a-d, 39–41, and therefore also vinyl ethers, such as isobutyl vinyl ether. The monomer which is most preferred is isobutene.

The process is preferably carried out at a temperature of from $0°$ to $-60°$ C. in low-boiling solvents. Saturated hydrocarbons, such as ethane, propane, butane or pentane, and hydrocarbon chlorides, such as methyl chloride or methylene chloride, or mixtures thereof, for example, may be used a suitable solvents.

Preferably, the metal chlorides are used, $BCl_3$ being particularly effective.

Those initiators which do not have hydrogen atoms on the carbon atoms in the $\alpha$-position to the halogen atoms and do not have or have at least two hydrogen atoms on the carbon atoms in the $\beta$-position are preferably used as initiators.

2,5-dichloro-2,5-dimethyl-hexane, 9,14-dichloro-9,14-di-n-heptyl-docosane, 2,5,8-trichloro-2,5,8-trimethyl-nonane, 2-chloro-2,3,3-trimethyl-butane and 2-chloro-2,4,4,6,6-pentamethyl-haptane are particularly preferred.

EXAMPLES

A. Production of the aromatic halogen compounds (comparison)

1. 2 chloro-2-methyl-ethyl-benzene(cumyl chloride)

This compound is produced according to the directions of Y. Okamoto and H. C. Brown, J. Am. Chem. Soc., 79, 1903, (1957)

2. p-di-($\alpha,\alpha$-dimethyl-chloromethyl)benzene(dicumyl-chloride)

This is produced according to the directions of J. P. Kennedy and R. A. Smith, T. Polymer Sci., Polym. Chem. Ed., 18, 1523–37, (1980).

B. Production of the aliphatic halogen compounds 1. 2-chloro-2-methyl-propane Commercial product which is washed, before use, with 5% aqueous $K_2CO_3$ solution, then with water, dried over $CaH_2$ and purified by distillation.

2. 2-chloro-2,4,4-trimethyl-pentane 15 ml of 2,4,4-trimethyl-pentene-1 are dissolved in 150 ml of $CH_2Cl_2$, cooled to $-30°$ C. and mixed dropwise with a mixture of 10.3 ml of thionyl chloride and 5.4 ml of $H_2O$. The mixture is then heated to $0°$ C. and washed after 2.5 hours with cold 1% aqueous $K_2CO_3$ solution, then with ice-cold water. The product is dried over MgSO$_4$ and distilled off. Yield 85%; n$_D^{20}$=1.4308; Bpt.$_{10\,mm}$ 38° C.

3. 2,5-dichloro-2,5-dimethyl-hexane 2,5-dimethyl-1,5-hexadiene are reacted correspondingly to B2 with thionyl chloride.

Yield: 81%; melting point 64° C.

C. Polymerisation method.

Polymerisation is carried out in a glass high vacuum apparatus by dissolving isobutene and the initiator in methylene chloride, cooling the mixture to the desired temperature and adding BCl$_3$. The polymerisation method and the working-up of the products are described in Makromol. Chem., 184, 553–562, (1983).

EXAMPLES 1 TO 5

Experimental conditions

| Initiator | 1.8 × 10$^{-3}$ mol/l |
|---|---|
| Isobutene | 0.07 mol/l |
| Solvent | CH$_2$Cl$_2$ |
| Reaction temperature | −80° C. |
| Reaction time | 30 minutes |
| BCl$_3$ | 0.2 mol/l |

| Example | Initiator | Monomer Yield (%) | $\overline{DPn}/\overline{DPth}$ | Functionality theoretical | actual |
|---|---|---|---|---|---|
| 1[1] | A 1 | 78 | —[2] | 1 | 0.65 |
| 2[1] | A 2 | 90 | 1 | 2 | 1.9 |
| 3[1] | B 1 | 17 | 9.5[3] | 1 | — |
| 4 | B 2 | 95 | 1 | 1 | 1 |
| 5 | B 3 | 94 | 1 | 2 | 2 |

[1]Comparative Example
[2]multimodal distribution (GPC), value therefore indeterminable
[3]extremely high molecular weight (~20,000), functionality therefore indeterminable.

The average degree of polymerisation $\overline{DPn}$ is determined using GPC. A Du Pont 830 HPLC apparatus is used with the column arrangement 10μ, 500 Å, 10$^4$ Å and 10$^6$ Å and using THF as eluent. Polyisoprene standards are used as the reference materials. During polymerisation, free from interference, the degree of polymerisation $\overline{DPn}$ determined in this manner should correspond to the theoretical value $\overline{DPth}$ and the expression $\overline{DPn}/\overline{DPth}$ should=1.

The functionality of the telechelics is determined by 1H-NMR measurements, by comparing the intensities of the resonance signals of aromatic protons (I) with the terminal aliphatic protons (II). They should be:

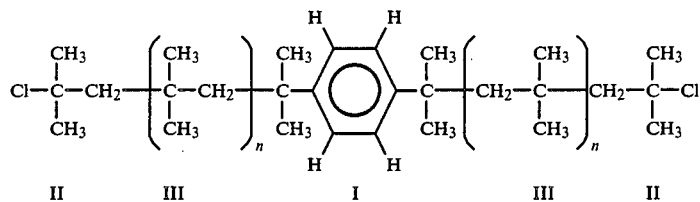

at a functionality of 1 in the ratio I:II=2:3, and at a functionality of 2 in the ratio I:II=1:3 (Examples 1 and 2).

The functionality of the telechelics started by aliphatic initiators is given by the intensity ratio of terminal methyl protons II, methylene protons III and chlorine analysis of the polymers.

As may be seen from the Examples, polymers are obtained, whose functionality is less than expected, by using the aromatic initiators (Examples 1 and 2). The same holds true for the relatively low molecular weight aliphatic initiator (Example 3). Furthermore, the polymers produced according to Examples 1 and 3 have a wide molecular weight distribution in gel chromatographic separation.

In comparison, the polymers produced by the measures according to the present invention correspond to the expected degree of polymerisation and the expected functionality.

EXAMPLES 6 TO 10

Polymerisation is carried out under the same conditions as in Examples 1 to 5, except that the temperature is −20° C.

| Example | Initiator | Monomer Yield (%) | $\overline{DPn}/\overline{DPth}$ | Functionality Theoretical | Actual |
|---|---|---|---|---|---|
| 6[1] | A 1 | 57 | —[2] | 1 | 0.53 |
| 7[1] | A 2 | 92 | —[2] | 2 | 1.75 |
| 8[1] | B 1 | 11 | 12.3[3] | 1 | — |
| 9 | B 2 | 94 | 1.0 | 1 | 1 |
| 10 | B 3 | 96 | 2.0 | 2 | 2 |

[1]Comparative Example
[2]multimodal distribution
[3]extremely high molecular weight (~25,000)

As seen from the Examples, the effectiveness of the initiators according to the present invention (Examples 9 and 10) is particularly clear at relatively high polymerisation temperatures. While the functionality of the products falls because of subsidiary reactions (Examples 6–8) when conventional aromatic initiators are used, it is maintained by the use of the aliphatic initiators (Examples 9 and 10).

We claim:

1. A process for the production of polymers having halogen end groups from cationically-polymerisable monomers, the monomer being polymerised in an inert solvent at a temperature of from +10° to −130° C. using a catalyst system consisting of a metal halide and an organic halide, characterised in that the organic halide corresponds to the following general formula:

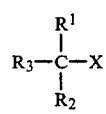

wherein

X represents a halogen atom;

R$_1$, R$_2$, R$_3$ represents C$_5$–C$_{10}$ cycloalkyl, or a C$_1$–C$_{20}$ straight- or branched-chain alkyl or

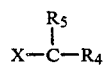

wherein $R_4$ and $R_5$ represent $C_5$–$C_{10}$ cycloalkyl or a $C_1$–$C_{20}$ straight- or branched-chain alkyl;

and that the organic halide has at least 5 carbon atoms and at most 50 carbon atoms and is in a concentration of from $10^{-1}$ to $10^{-6}$ mols per mol of monomer, and that $BX_3$, $SnX_4$, $TiX_4$, $SbX_5$ or $FeX_3$, wherein X denotes fluorine, chlorine, bromine or iodine, is used as the metal halide in from 2 to 500 times molar excess, based on the organic halide.

2. A process according to claim 1, characterised in that isobutylene is used as monomer.

3. A process according to claim 1, characterised in that $BCl_3$, $SnCl_4$, $TiCl_4$, $SbCl_5$ or $FeCl_3$ is used as metal halide.

4. A process according to claim 3, characterised in that $BCl_3$ is used as metal halide.

5. A process according to claim 1, characterised in that the process is carried out at a temperature of from $-15°$ to $-60°$ C.

* * * * *